United States Patent
Wang et al.

(10) Patent No.: US 6,590,874 B1
(45) Date of Patent: Jul. 8, 2003

(54) METHOD AND SYSTEM FOR IMPLEMENTING OUTER LOOP POWER CONTROL IN DISCONTINUOUS TRANSMISSION MODE USING EXPLICIT SIGNALLING

(75) Inventors: Yiping Wang, Plano, TX (US); David Paranchych, Richardson, TX (US); Ashvin Chheda, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/410,208

(22) Filed: Sep. 30, 1999

(51) Int. Cl.$^7$ ............................................. H04B 7/185
(52) U.S. Cl. ....................... 370/318; 370/252; 370/320; 455/522
(58) Field of Search ................................ 370/335, 342, 370/329, 328, 331, 332, 252, 320, 317, 318, 511; 455/522, 226.2, 226.3, 69

(56) References Cited

U.S. PATENT DOCUMENTS

| | | | |
|---|---|---|---|
| 6,137,789 A | * 10/2000 | Honkasalo | 370/342 |
| 6,219,342 B1 | * 4/2001 | Rege | 370/318 |
| 6,301,485 B1 | * 10/2001 | Lee | 455/522 |
| 6,373,823 B1 | * 4/2002 | Chen et al. | 370/252 |

OTHER PUBLICATIONS

Quality Indicator Bit(FPC_MODE 100), Jul. 1999 Montreal, Samsung Electronics Co. Ltd. Park et al.*
Jaemin Ahn et al., "Frame Error Estimation of DCCH in DTX Mode", Samsung Electronics Co., LTD., pp. 1–11, 1999.
Jimsoo Park et al., Quality Indicator Bit (FPC_Mode 100), Samsung Electronics Co., LTD., pp. 13, Jul. 1999 Montreal.
Soon Young Yoon et al., Performance of P2 Gating Operation, Samsung Electronics Co., LTD., Jul. 26–30, 1999, Boulder, CO.

* cited by examiner

*Primary Examiner*—Dwayne Bost
*Assistant Examiner*—Joy K. Contee
(74) *Attorney, Agent, or Firm*—John D. Crane; Bracewell & Patterson, L.L.P.

(57) ABSTRACT

A signalling method for controlling unnecessary power increases and call drop during discontinuous transmission (DTX) mode of a frame-based transmission system. The signalling method comprises the steps of (1) detecting, at a receiver end of the transmission system a status of a transmitted frame indicating one of two possible transmission modes including (a) when a gating-off of the traffic channel occurs, and (b) when no gating-off of traffic occurs and normal traffic is being transmitted, and (2) controlling a change in the receiver target bit energy to noise spectrum density ratio Eb/No in response to the detection step so that a receiver target Eb/No is increased only when the detecting step does not indicate a gating-off of traffic has occurred.

23 Claims, 9 Drawing Sheets

METHOD AND SYSTEM FOR IMPLEMENTING OUTER LOOP POWER CONTROL IN DISCONTINUOUS TRANSMISSION MODE USING EXPLICIT SIGNALLING

CROSS-REFERENCE TO RELATED PATENT APPLICATION

The present invention is related to the subject matter of co-pending U.S. patent application entitled "Method and System for Performing Outer Loop Power Control In Discontinuous Transmission Mode," filed concurrently herewith, Ser. No. 09/410,209, assigned to the assignee herein named. The contents of the co-pending patent application are incorporated by reference herein.

BACKGROUND OF THE INVENTION

1. Technical Field

The present invention relates in general to Code Division Multiple Access (CDMA) systems and in particular to a Dedicated Control Channel (DCCH) and a Supplemental Channel (SCH) in a CDMA system. Still more particularly, the present invention relates to a method and system for controlling power in a DCCH and a SCH of a CDMA system operating in Discontinuous Mode (DTX).

2. Description of the Related Art

The fast growth in the use of wireless means of communication has resulted in a complex process for world wide frequency allocations and a number of frequency allocation protocols. Code Division Multiple Access (CDMA) is one of the distinct digital channel sharing topologies which have emerged as a result of a growing need for more channels or more efficient use of channels in digital communication. In a typical CDMA system, a honeycomb type pattern of cells is created which utilizes the same range of radio frequencies. CDMA systems can utilize precisely the same frequency spectrum in all sectors. This allows a single frequency to serve multiple users. The CDMA air interface is very efficient in its use of the subscriber station transmitter power, enabling the widespread commercial use of low cost, lightweight, hand-held portable units that have vastly superior battery life. The technology is also very efficient in its link budgets, minimizing the number of base stations required for an excellent grade of service coverage. Also, CDMA's use of soft handoff (occurring when a user passes across a cell boundary) nearly eliminates the annoyance of dropped calls, fading, and poor voice quality.

The specifications for CDMA operation are outline in the Electronic Industries Association/Telecommunications Industry Association (EIA/TIA) IS-95-A & TSB74 standards document entitled Mobile Station-Base Station Compatibility Standard for Dual-Mode Wideband Spread Spectrum Cellular System or *CDMA Principles of Spread Spectrum Communication,* by Andrew J. Viterbi. Recent developments in CDMA technology have led to the development of the IS-2000 standard to replace the traditional IS-95 standard.

The cdma2000 family of standards specifies a spread-spectrum radio interface that uses CDMA technology to meet the requirements for third generation (3G) wireless communication systems. Development of the cdma2000 family of standards has, to the greatest extent possible, adhered to the current architecture by specifying different layers in different standards. The physical layer is specified in IS-2000-2, the Medium Access Control (MAC) layer in IS-2000-3, the Link Access Control (LAC) layer in IS-2000-4, and upper layer signaling in IS-2000-5. The standards in the family correspond to the CDMA layers, and include:

IS-2000-1 Introduction to cdma2000 standards for spread spectrum systems

IS-2000-2 Physical Layer Standard for cdma2000 spread spectrum systems

IS-2000-3 Medium Access Control (MAC) Standard for cdma2000 spread spectrum systems IS-2000-4 Signaling Link Access Control (LAC) Standard for cdma2000 spread spectrum systems IS-2000-5 Upper Layer (Layer 3) Signaling Standard for cdma2000 spread spectrum systems In addition, the family includes a standard that specifies analog operation, to support dual-mode mobile stations and base stations:

IS-2000-6 Analog Signaling Standard for cdma2000 spread spectrum systems

During normal operation, CDMA systems utilize frame transfer by which data is stored and transferred in a frame protocol format. Each frame has an associated power control block of bits which assist in ensuring that the signals are transmitted with sufficient power to be recognized at the receiver end for a given Grade of Service (GOS). As a CDMA phone is transmitting, the receiving cell site is constantly measuring the signal strength of the transmission. When the signal weakens, the transceiver in the cell site transmits power control up commands to the phone, instructing it to increase its power. If the signal strengthens, power control down commands instruct the phone to decrease its power.

The IS-95 standard, defines procedures for a complex power control method, designed to save on battery life and help prevent co-channel interference. The IS-2000 standard has been introduced to replace the IS-95 standard and incorporates many of the power attributes of its predecessor. Throughout the remainder of this document, use of the term CDMA, cdma2000 or IS-2000 refers to the cdma2000 family of standards.

In IS-2000, power considerations are important for efficient use of the system. Thus, the IS-2000 standard includes a dedicated control channel (DCCH). Assuming an efficient power control method, the use of DCCH can provide up to 3.8 dB gain when no data is being sent. This gain is a result of discontinuous transmission (DTX). When there is no data to send, DCCH is able to stop transmitting everything but power control bits in frames, while the fundamental channel (FCH) has to transmit eighth rate frames. However, the DTX transmission on DCCH may often degrade the performance of outer loop power control (i.e., the mechanism which adjusts the target Eb/No on a per frame basis) on both the forward and reverse links. This decreases the potential gain achievable from the use of the DCCH and may result in a performance penalty.

Thus, two major problems exist in the use of DCCH in DTX mode. These are (1) problem in outer loop power control resulting in reduced capacity, and (2) possible call drop. Both problems stem from the receiver's inability to distinguish between an erroneous frame and a cessation of transmission. In normal operating modes, when a frame error is detected at the Receiver Station, the receiver increases the target bit energy to noise spectrum density ratio (Eb/No). Otherwise, the target signal power level (Eb/No) is decreased. However, during DTX period, only power control bits are transmitted. In this case, the receiver is not able to distinguish between an error frame and a cessation of transmission. The misinterpretation of a transmission stoppage as a bad frame causes the receiver to increase its target Eb/No, and thereby commands the transmitter to power up unnecessarily. If the transmitter is smart enough, it can ignore this power up command as it knows it is in DTX mode. However, when the data transmission resumes, the target Eb/No at the receiver is too high. Consequently, the transmitter is forced to transmit data at a higher power level than necessary. In addition, the mobile unit stops transmission on the reverse link if it receives twelve consecutive erroneous frames on the forward link and it drops the call if there are no two consecutive good frames during any five second period. Therefore, DTX on the DCCH may also lead to possible call drops if no detection is used to determine when DTX is on or off.

Samsung has proposed two methods of frame error estimation of DCCH in DTX mode to try to solve the outer loop power control problem. These methods focus on the forward link and estimate the forward link error of the DCCH in DTX. The methods are summarized below.

1. Mobile System (MS) measures the average Eb/No using power control bits over a frame and maps it into frame error rate (FER) using a lookup table made from the additive white gaussian noise (AWGN) channel with a pre-determined offset value. Then the MS determines frame error in a stochastic way, i.e., generating a random number uniformly distributed over [0, 1] and comparing it with the FER. If the random number is larger than the FER, then the received frame is considered as a good frame. Otherwise, a frame error occurs.

2. MS measures the average Eb/No power control bits over one frame duration and compares the average Eb/No with the certain threshold value. If the average Eb/No is less than the threshold, the frame is considered bad. Otherwise the frame is considered good.

One obvious drawback with both methods is that while they may work well with a particular case for which they are optimized (eg., a particular MS speed and a channel condition), they will not work well with all other cases, such as, different MS speeds and propagation environments, since ithe relationship between Eb/No and frame error rate (FER) is not the same for different channel conditions.

Additionally, in the first method, a lookup table for Eb/No to FER mapping is very critical to the performance. In reality the Eb/No-FER relation varies widely with different propagation conditions. An inaccurate Eb/No-FER mapping could drastically degrade performance of the system using Samsung's first approach.

In the second method, the value of the threshold is critical to the performance. It, in fact, also depends on the accuracy of Eb/No to FER mapping. If the value is set at the required Eb/No value for a given set of conditions, it will result in a very high average forward gain with no frame errors in some other conditions. Therefore, power is wasted. There is an optimal threshold at which the same performance and capacity could be achieved as usual forward link outer loop power control. However, this optimal value is highly sensitive to the mobile speed and propagation environment. There is no way to define a unified value. Moreover, a little bias in the threshold will lead to a big performance or capacity degradation. Evaluations of the performance of the second method yield results which are represented in the tables of Appendix B. Similar results can be expected with the first method.

The simulations of Appendix B indicate that the optimal threshold value in Samsung's method is sensitive to the MS speed and location (interference environment). Although the Samsung methods solve the call drop issue, they degrade the system performance or capacity. Furthermore, they do not help on the forward link. It is also expected that the threshold varies with the number of multipaths and propagation environment. Therefore, there is no way to define a unified optimal threshold value in Samsung's method. To meet the target FER in all scenarios, a worst case threshold could be defined in their method. However, this threshold value will sacrifice a lot of forward power in most cases.

The present invention thus recognizes that it would be desirable to have a method and system for preventing unnecessary power up of transmitters as a result of false readings of frame transmission during DTX. It would further be desirable to keep target Eb/No from unnecessarily increasing while also preventing the mobile unit from mistakenly stopping reverse transmission and/or dropping calls due to DTX.

SUMMARY OF THE INVENTION

It is therefore one object of the present invention to provide an improved CDMA system.

It is another object of the present invention to provide an improved power control method and system for a CDMA system.

It is yet another object of the present invention to provide an improved method and system for controlling power in a CDMA system operating in Discontinuous Mode (DTX).

The foregoing objects are achieved as is now described. A signalling method for controlling unnecessary power increases and call drop during discontinuous transmission (DTX) mode of a frame-based transmission system is provided. The signalling method comprises the steps of (1) detecting, at a receiver end of the transmission system a status of a transmitted frame indicating one of two possible transmission modes including (a) when a gating-off of the traffic channel occurs, and (b) when no gating-off of traffic occurs and normal traffic is being transmitted; and (2) controlling a change in the target bit energy to noise spectrum density ratio Eb/No in response to the detecting step so that a target Eb/No is increased only when the detecting step does not indicate a gating-off of traffic has occurred.

In a preferred embodiment of the invention, the detecting step includes calculating a ratio of a traffic signal-to-noise ratio (SNR) value to a SNR value of a power control bit stream over a frame period, establishing a threshold value correlated to a point above which the ratio indicates a normal frame is being transmitted, and comparing the ratio with the threshold. The target signal strength is then adjusted based on the results of the comparison.

In another preferred embodiment, the detecting step includes identifying one or more of a plurality of power control bits per frame as a DTX indicator and manipulating the bit to indicate to a receiver when a traffic channel in the frame is gated-off. When the frame arrives at the receiver the bit is analyzed and the target signal strength or bit energy to noise spectrum density (Eb/No) is adjusted accordingly.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

The present invention implements apower control method for use in transmission of packets on a DCCH and a SCH of a CDMA system in DTX mode. The invention is applicable to both the forward and reverse links. The invention solves the power control and call drop problems inherent in prior systems by letting the receiver (i.e., the base station or mobile station depending on whether transmission is in the reverse or forward link) know whether or not the transmitter has gated off the traffic channel on the DCCH or SCH. The invention provides a way to keep the forward or reverse target Eb/No from unnecessarily increasing during DTX mode. By implementing the invention, the system capacity will improve when the DCCH or SCH is used substantially. Two different power control methods/algorithms are described herein which are suitable for use in different transmission states. In one preferred embodiment, the invention provides a method to detect if DTX is on or off without the reliance on explicit signalling. In another embodiment, one or two power control bits per frame are utilized as a DTX indicator to keep the target Eb/No from unnecessarily increasing during DTX such that the system capacity is improved.

Various technical terms and/or acronyms will be utilized in the description of the embodiment. Those skilled in the art are familiar with these and other terms which may be utilized herein. A short list of the more common ones with their definitions include: (1) BTS: Base Transceiver Subsystem; (2) DCCH: Dedicated Control Channel; (3) DTX: Discontinuous Transmission; (4) SCH: Supplemental Channel; (5) CDMA: Code Division Multiple Access; (6) FER: Frame Error Rate; (7) MS: Mobile Station; and (8) SNR: Signal-to-Noise Ratio, utilized interchangeably with (9) Eb/No: bit energy-to-noise spectrum density ratio.

Figure 1A:
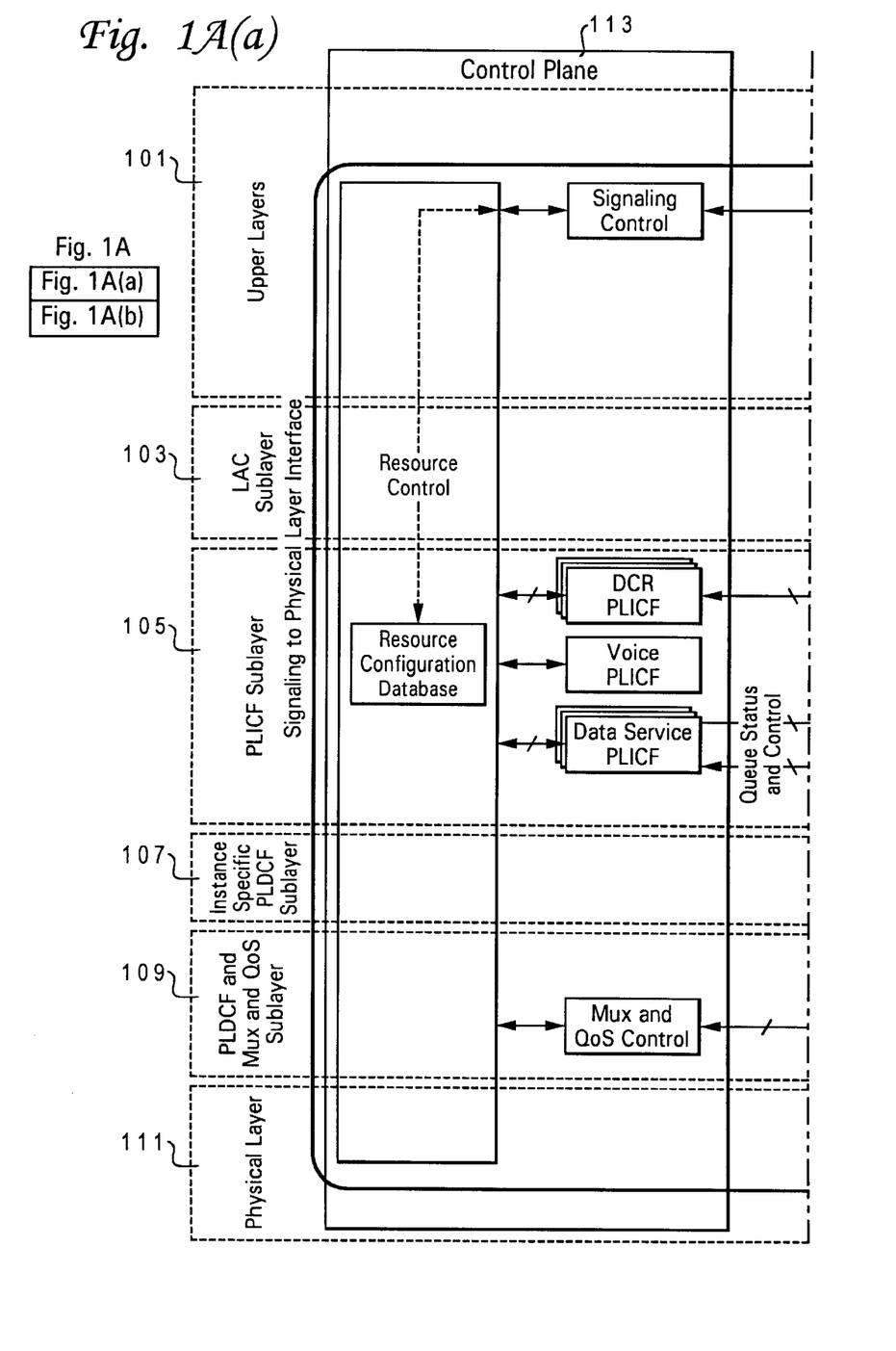
FIG. 1A illustrates a CDMA-2000 architecture in which a preferred embodiment of the present invention may be implemented.

The preferred embodiment of the invention is carried out in a CDMA 2000 telecommunications network. FIG. 1A illustrates the general architecture of CDMA 2000. CDMA architecture consists of six primary layers. These include the upper layer 101, the LAC sublayer 103, the physical layer independent convergence function (PLICF) sublayer 105, the instance specific physical layer dependent convergence function (PLDCF) sublayer 107, the PLDCF and Mux and quality of service (QoS) sublayer 109, and the physical layer 111. Each layer further consists of a control plane 113 and a data plane 115. DCCH 117, SCH 119, and the various embodiments of the present invention are substantially implemented in the data plane 115 of physical layer 111.

Figure 1B:
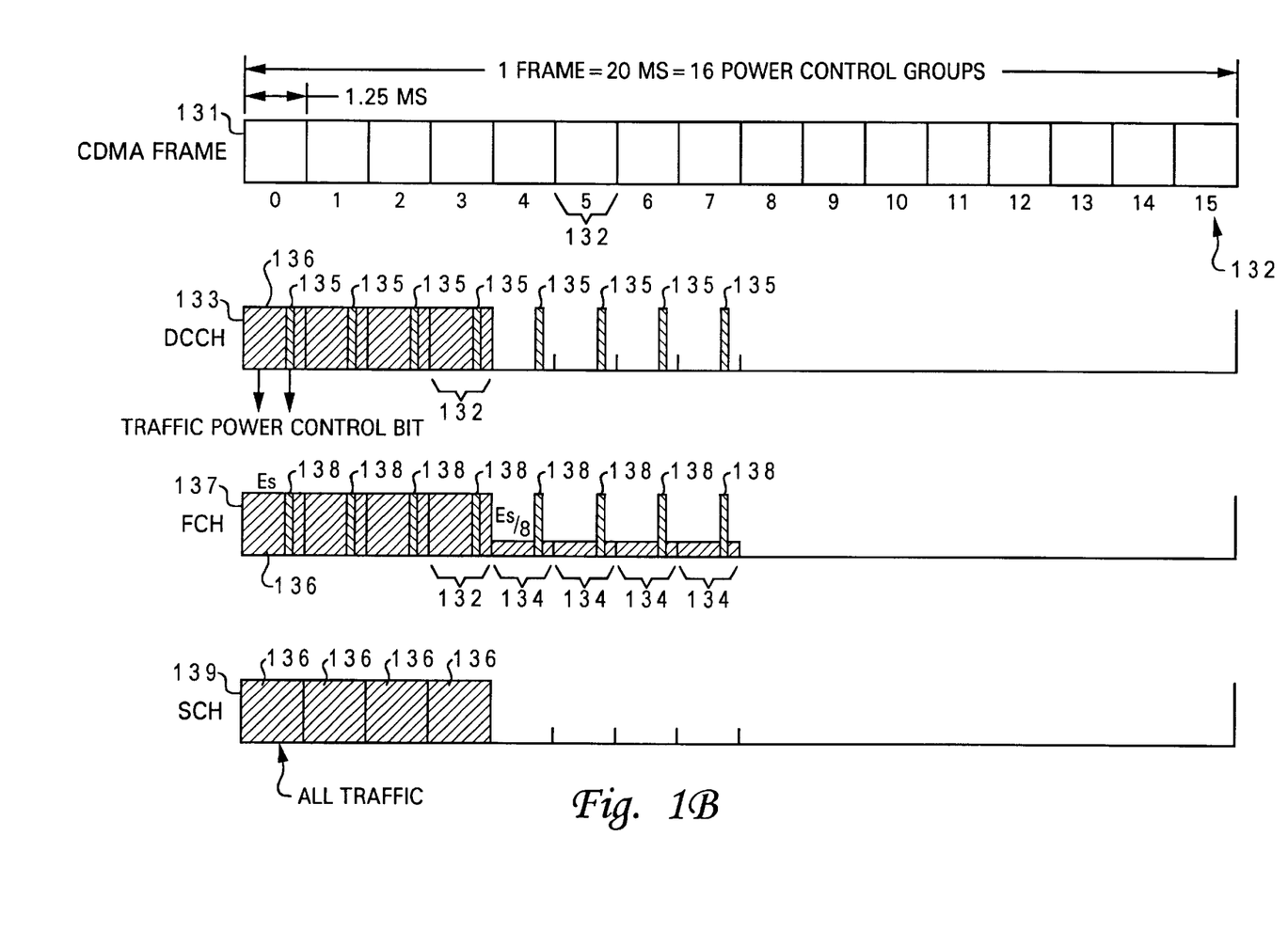
FIG. 1B illustrates the transmission frame utilized within the preferred embodiment of the invention.

FIG. 1B illustrates a series of frames which are transmitted within an exemplary CDMA 2000 communications system utilized within the invention. Each frame is 20 ms long, which equates to 16 power control groups (or blocks) 132. Depicted are a CDMA frame 131, a DCCH frame 133, a FCH frame 137 and a SCH frame 139. The first four power control blocks 132 of DCCH frame 133 are shown with data traffic 136. Each power control block 132 of DCCH frame 133 also has an associated power control bit 135. FCH frame 137 also has associated power control bits 138 within each power control block 132. However, unlike DCCH frame 133 which may transmit a power control bit 135 without any data traffic 136 in a power control block 134 (as illustrated in the second set of four power control blocks 132 in DCCH frame 133), FCH frame 137 does not support DTX and therefore transmits with a power level of ⅛ of the transmit power (as illustrated by the second set of four power control blocks 134 in FCH frame 137). SCH frame 139 transmits only data traffic 136 (i.e., no power control bit 135). During implementation of one embodiment of the invention, a '0' value of the power control bit 135 indicates to the mobile station that it is to increase the mean output power level, and a '1' value indicates to the mobile station that it is to decrease the mean output power level. The amount that the mobile station increases or decreases it power for every power control bit 135 is determined by a system designer and other environmental considerations.

Figure 2:
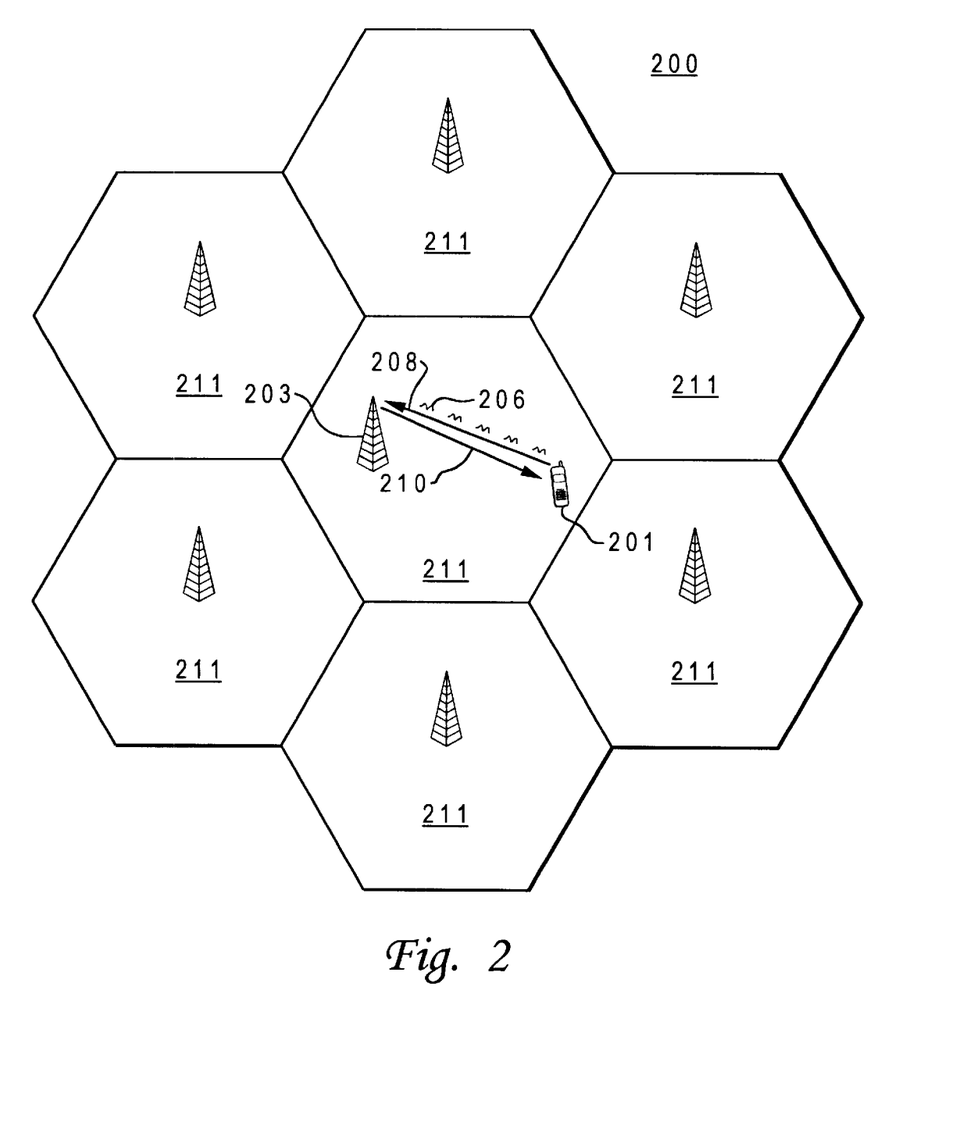
FIG. 2 illustrates a wireless system utilized in accordance with a preferred embodiment of the present invention.

Turning now to FIG. 2, there is depicted a basic mobile cellular transmission system. Mobile transmission system 200 consists of a representative cell 211, for CDMA architecture, in which is located a base station (BTS) 203. Receiving or target mobile station (MS) 201 accepts transmitted packets via airwaves 206 from originating BTS 203. The underlying transmission scheme utilizes CDMA protocol and is controlled by a series of routers, gateways, etc. not illustrated in this embodiment. Two arrowed paths are depicted corresponding to the forward propagation path 208 and reverse propagation path 210.

The present invention preferably works within a cellular transmission system as depicted in FIG. 2; however those skilled in the art appreciate that many various types of system structure are possible and that the given embodiment is in no way meant to be limiting on the scope of the invention.

Two methods are presented to solve the power control and call drop problems with DTX mode. Both rely on letting the receiver know whether or not the transmitter gates off the traffic channel on the DCCH and SCH. This allows the application of two different power control algorithms to two transmission states. The first method is power detection based, and the second is signaling based. Both methods can be used on both the forward and reverse links.

A. Power Detection Method

With the power detection method, the receiver tries to detect whether DTX is on or off based on the received signal. One idea is to use the power level (or SNR) of the traffic channel on the DCCH or SCH for the detection since the power level is high when the traffic bits are sent and low when not. The invention recognizes that the absolute value of the power alevel varies widely with fading. Detection of the presence of traffic by comparison with an absolute threshold is unreliable, because a severe fade can decrease the received power to a value below the threshold no matter how small it is set. To eliminate this problem, the invention utilizes the ratio of $SNR_{traffic}$ to $SNR_{pcb}$ as a decision variable. More specifically, in DCCH, the decision variable is the ratio of DCCH traffic bits SNR to DCCH power control bits SNR. In the case of SCH, the decision variable is the ratio of SCH traffic bits SNR to DCCH or FCH power control bits. Because fading over traffic bits is highly correlated with fading over power control bits, the decision variable is not sensitive to fading, MS location, and/or propagation environment.

Figure 3:
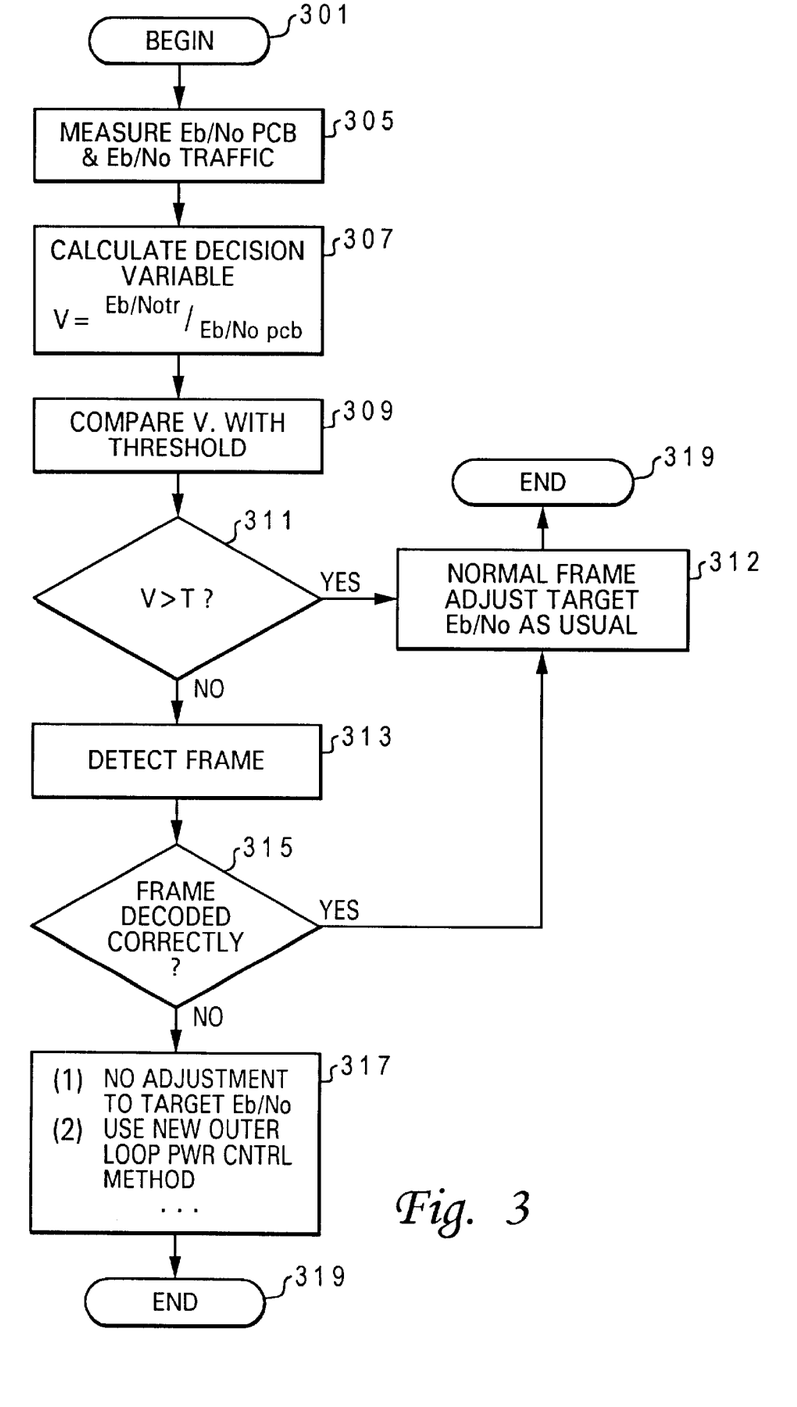
FIG. 3 is a high level flow diagram of the power control process utilizing a power ratio in accordance with a preferred embodiment of the present invention.

FIG. 3 is a high level flow diagram of a process in the power detection method utilized to control the target Eb/No. In the preferred embodiment, the functionality of the above processes is implemented in the logic units of the BTS and/or MS and other hardware or software components. After the process begins (step 301), when the frame arrives at the receiver, the Eb/No values of the traffic and power control bits (pcb) are read and evaluated (step 305). Then, a decision variable, V, is calculated over a frame period (step 307). The decision variable is a ratio of the evaluated signal strength of the traffic to the signal strength of the pcb and is calculated as:

$$V = \frac{(E_b/N_o)_{traffic}}{(E_b/N_o)_{pcb}}$$

Then, V is compared to a pre-determined threshold, T (step 309), and a determination is made of whether the value of V is greater than that of T (step 311). If V is greater than T, then a normal frame is being transmitted, and the receiver detects frame quality and then adjusts the target Eb/No as the normal power control does (step 312). Then the process ends (step 319). If, however, V is less than T, then the receiver assumes the current frame is a traffic channel gated off frame, but still tries to detect the frame (step 313). A determination is then made on whether the frame has been detected correctly (step 315). If the frame is decoded correctly (i.e., the frame is not really gated-off), the target Eb/No will be decreased as in a usual case (step 312).

If, however, the detection indicates a bad frame, then the receiver either does not adjust the target Eb/No, or uses an outer loop power control method (step 317) based on the reception of something other than traffic frames. Then the process ends (step 319).

Simulations of the invention were conducted for different MS speeds, locations and propagation environments to illustrate the effectiveness of the detection method of this invention. The simulation is based on the IS-2000 DCCH configuration with the following specifications. The data rate of the DCCH is 9.6 kb/s. The coding rate is one half, and the spreading gain is 64. The power control step size on the forward link is 0.5 dB. The maximum forward gain is fixed at 0.5 or 50% of maximum BTS output power. The pilot channel gain is −7 dB relative to the maximum BTS output power. A single multipath Rayleigh fading channel is considered and the ratio of in-cell to out-of-cell interference is 8 dB. The output of simulations is the decision variable in two cases. One is the normal traffic channel being transmitted, the other is the traffic channel being gated-off.

Figure 5A:
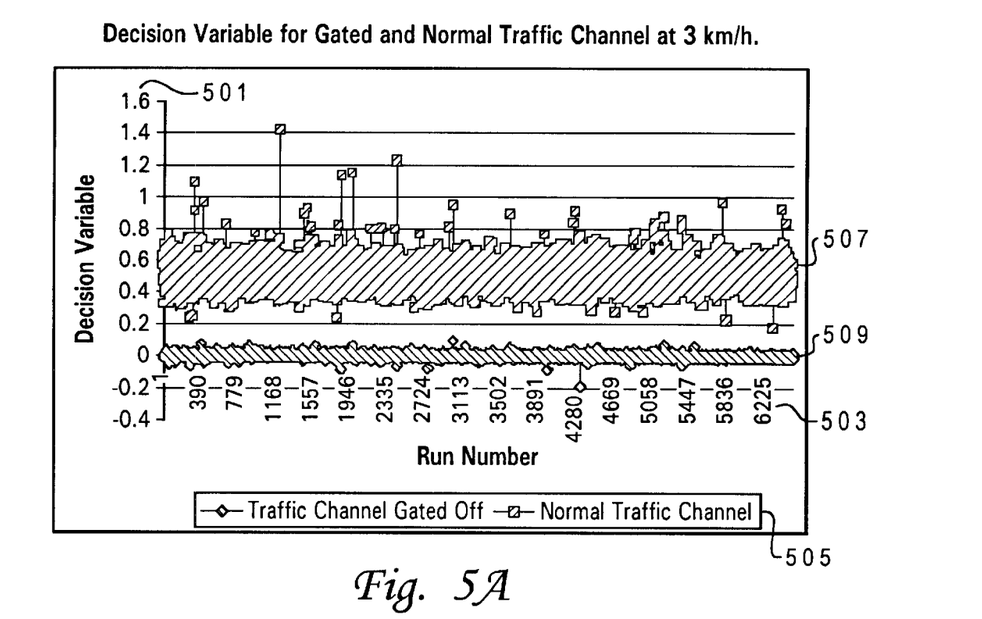
FIGS. 5A, 5B, and 5C depict graphs of the decision variable for simulations at different MS speed in accordance with a preferred embodiment of the present invention.
Figure 5B:
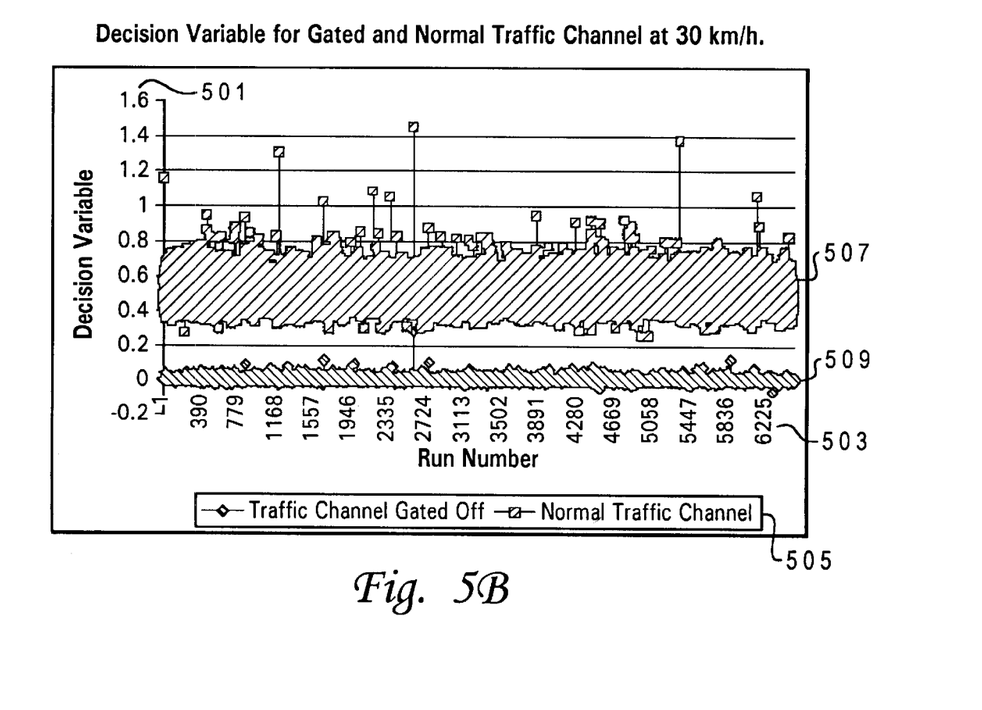
Figure 5C:
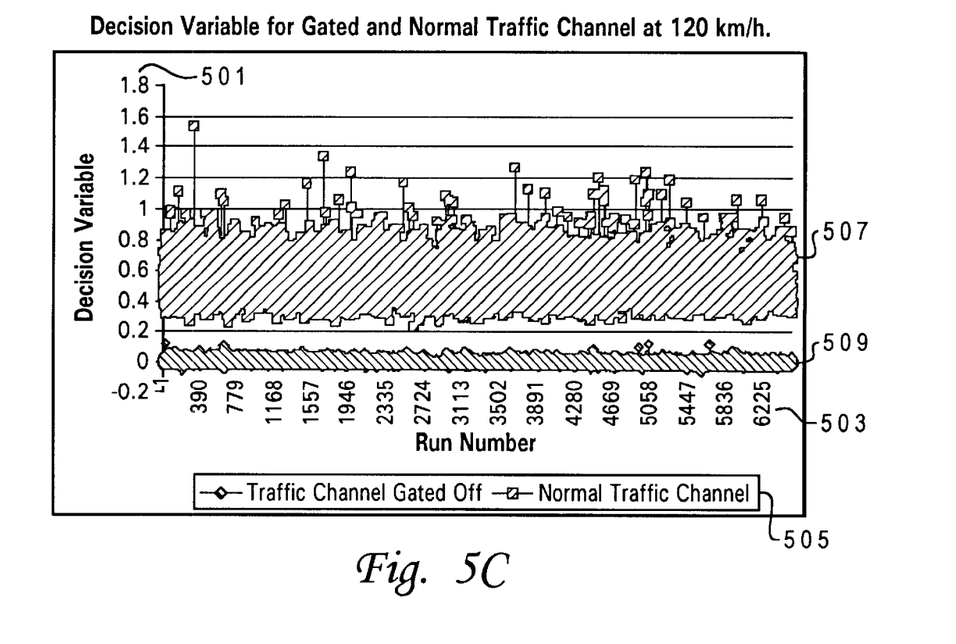

FIGS. 5A, 5B, and 5C show the decision variable for is different MS speeds during normal traffic channel and gated traffic channel operation as illustrated in the key 505. These figures represent the changes due to different mobile speeds and will be described together. FIG. 5A represents a mobile speed of 3 km/h, while FIGS. 5B, and 5C represent speeds of 30 km/h and 120 km/h, respectively. The decision variable is plotted along the Y axis 501 against the run number plotted on the X axis 503. Two sets of points are plotted. The higher physical level points represent the normal traffic channel 507, while the lower physical level points represent the gated traffic channel 509. Gated traffic channel 509 is clearly delineated close to the zero reference point of the Y axis 501. Normal traffic channel 507 is not as clearly delineated, but falls within a range having a mean value of about 0.5 on the Y axis 501. Thus, as is illustrated, the decision variable is fairly confined and well separated with a mean value of zero if the traffic channel is gated off, and a mean value of about 0.5 if the normal traffic channel is transmitted. Therefore, for this illustrative embodiment, the value of the threshold, T, is selected as 0.15 to separate/distinguish the normal traffic channel and the gated off traffic channel.

Figure 6A:
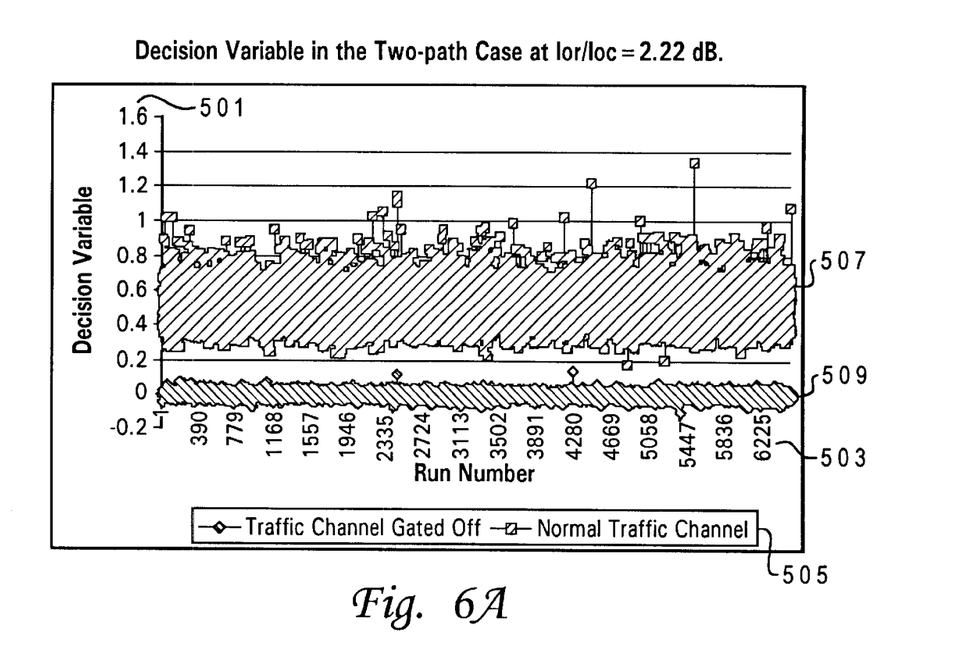
FIGS. 6A, 6B and 6C depict graphs of the decision variable at different interference environments at two path Rayleigh fading environment in accordance with a preferred embodiment of the present invention.
Figure 6B:
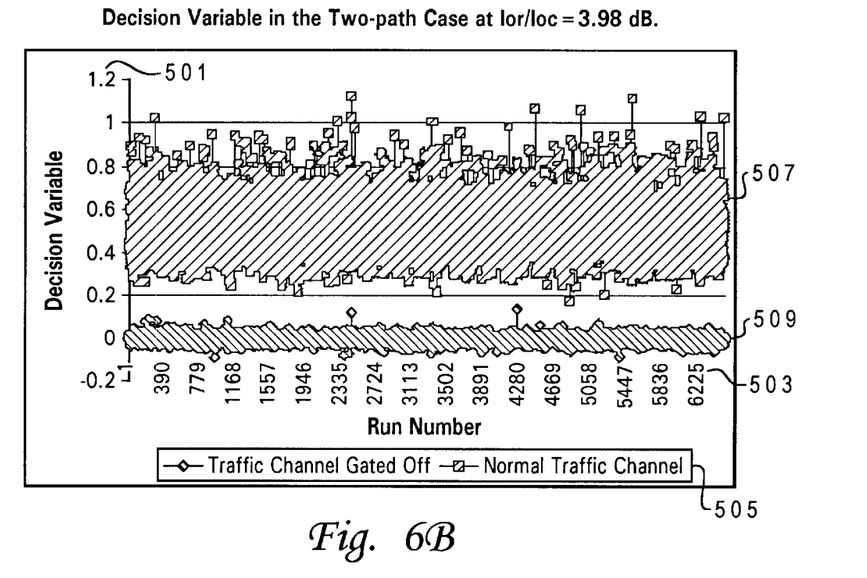
Figure 6C:
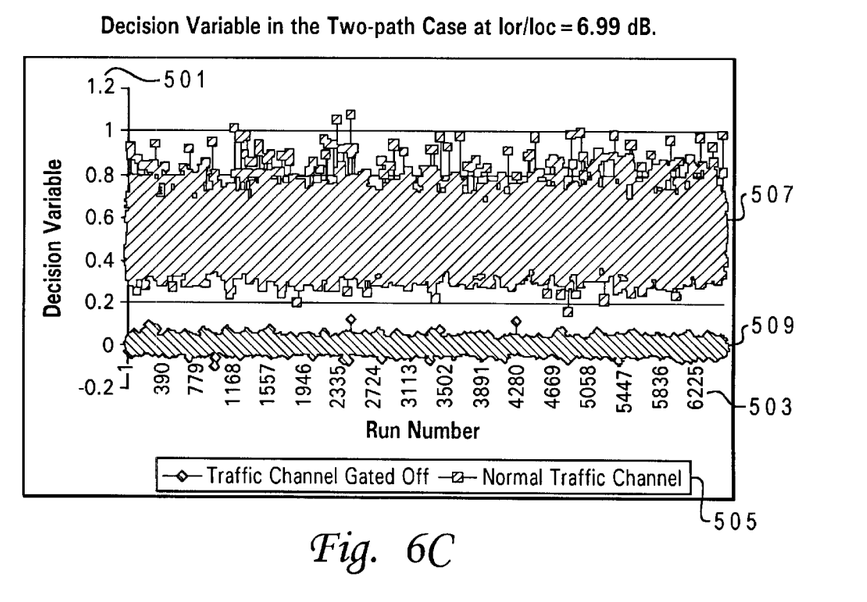

To illustrate the sensitivity of the power detection algorithm to mobile location and propagation environment, the mobile speed was fixed at 30 km/h and a series of simulations run for two-path Rayleigh fading environment. FIGS. 6A, 6B and 6C show the decision variable at the mobile speed of 30 km/h for different interference environments, which translates into different mobile locations. The axes and variables are similar to those of FIG. 5A and have been described with reference to that figure. The ratio of interference cost within the cell (Ior) and interference cost outside of the cell (Ioc) in FIG. 6A is 2.22 dB, while those of FIGS. 6B and 6C are 3.98 dB and 6.99 dB, respectively. When the distribution of the decision variable FIGS. 6A, 6B and 6C are compared, the distributions of the decision variable in different cases are very similar to each other. Therefore, the power detection method of this invention is not sensitive to the mobile location.

FIGS. 6A, 6B and 6C also show the decision variable for two-path Rayleigh fading environment at the mobile speed of 30 km/h. Compared to FIG. 5B, a single-path Rayleigh fading environment, the mean values of the decision variable on both the normal traffic channel and the gated off traffic channel remain unchanged. Therefore, the optimal threshold in the detection method of the implementation can be applied to any transmission condition.

Two observations are visible from the above figures: (1) The decision variables at different Ior/Ioc values are very similar to each other. This implies that the power detection method is not sensitive to the mobile location; and (2) compared with the one-path case, the separation point between the decision variable of normal traffic channel and the decision variable of gated off traffic channel remains unchanged. Therefore, the optimal threshold in the decision method can be used in different propagation environments. Based on the above results, it is seen that the power detection method of the present invention is not sensitive to mobile speed, mobile location and propagation environment. The invention can thus be used in all situations.

B. Signalling Method

The signal method is an outer loop power control method to solve the power control problem in DTX mode. The receiver is enhanced to include the capability of distinguishing and interpreting the indicator bit. In the implementation of the invention, one or two power control bits per frame are utilized as a DTX indicator. The DTX indicator informs the receiver MS whether the traffic channel in the frame is transmitted or gated off.

In a preferred embodiment, the first power control bit in a frame is utilized to indicate the traffic channel status of the current frame. In this embodiment, a "1" represents a normal frame being transmitted, and a "0" stands for the traffic channel being gated. In alternate embodiments, the position of the indicator could be anywhere within the power control bits in a frame. Also, the "1" could be utilized to represent the traffic channel being gated. In the preferred embodiment, the selected bit defaults to normal transmission mode. When a frame is to be gated on the traffic channel, the gating mechanism causes the particular bit to be set to reflect this gated transmission mode of the traffic channel. Realizing that the bit may be received in error, the invention allows the receiver to check and ensure that the frame carries no traffic, as is described below.

Figure 4:
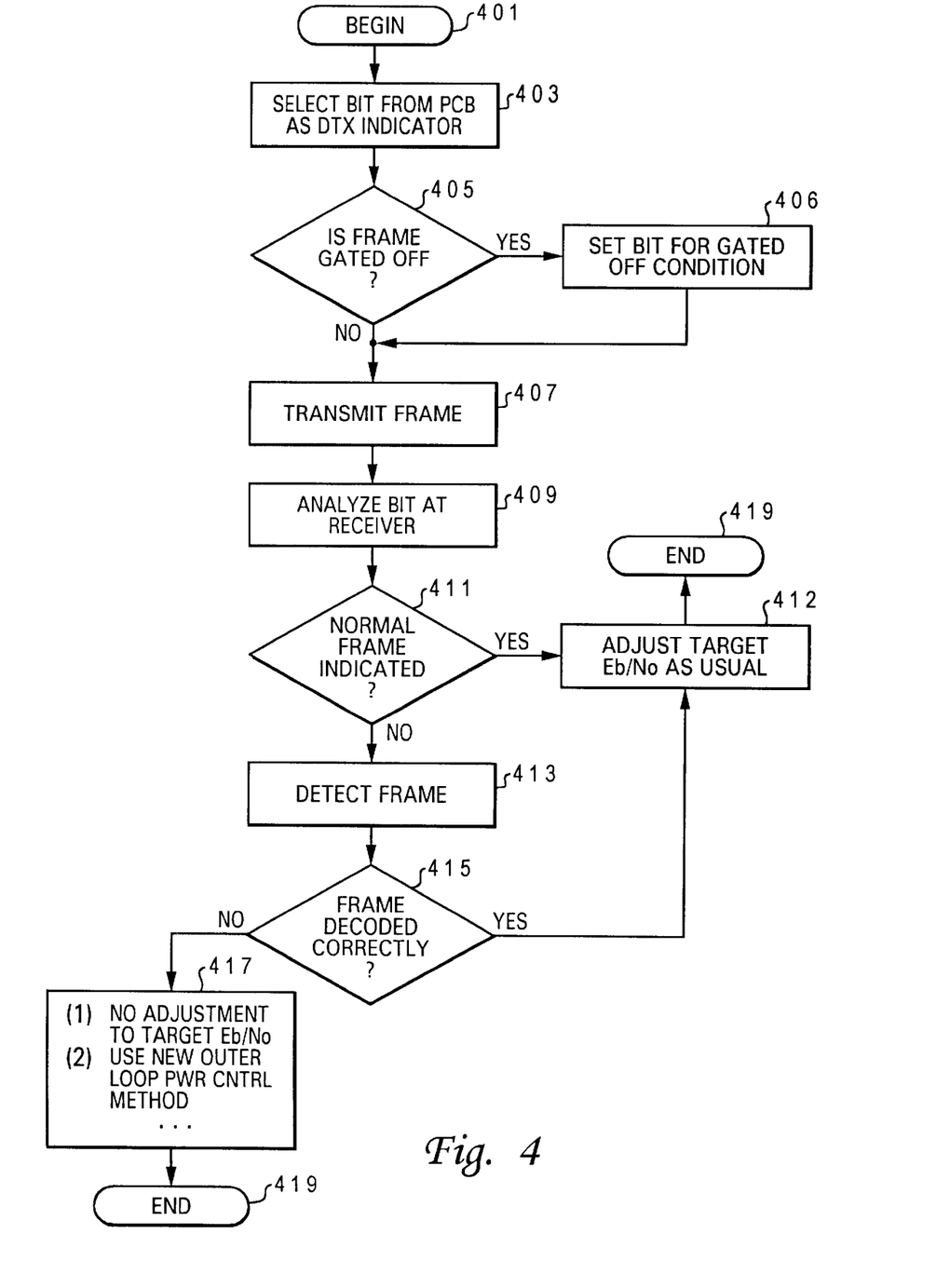
FIG. 4 is a high level flow diagram of the power control process utilizing a power control bit signalling method in accordance with a preferred embodiment of the present invention.

FIG. 4 depicts a flow chart of the process of implementing the signal method according to the present invention. The process begins (step 401) when a particular bit from the power control bits is selected to be the indicator (step 403). The traffic channel gating mechanism and frame then determines whether the traffic is gated off (step 405). If the traffic is gated off, the value of the bit is set to reflect a gated-off transmission mode (step 406). Otherwise, the bit is set to relect normal transmission mode. The frame is then transmitted to the receiver (step 407). The receiver checks the bit to determine if it indicates a normal mode (step 409). If a normal mode is indicated (i.e. the receiver receives the indicator saying a normal frame is being transmitted) (step 411), the receiver adjusts (i.e. decreases) the target Eb/No as in the normal transmission mode (step 412). If, however, the indicator indicates a gated-off traffic channel in the current frame, then the receiver still tries to detect the frame (step 413). A check is made to determine if the frame is decoded correctly (step 415). If the frame is decoded correctly, then the frame is not really traffic channel gated off, and the target Eb/No is adjusted/decreased as in normal transmission mode (step 412) If the detection indicates a bad frame, then the receiver does not adjust the target Eb/No, or uses an outer loop power control algorithm (step 417) based on the reception of something other than traffic frames. Then the process ends (step 419).

Implementation of the signalling method of the invention has some effect on the overall system performance. When DCCH is running alone or with FCH, DCCH is 800 Hz fast power controlled. After utilizing one bit as the indicator, the fast power control reduces to 750 Hz. In the worst case scenario where DCCH is running with SCH in which the fast power control is at 400 Hz, utilizing the bit reduces it to 350 Hz fast power controlled. Thus the invention results in a loss of 50 Hz fast power control. However, the simulation results, described in Appendix A, illustrate that, compared with the normal 800 Hz fast power control, the 350 Hz power control performance degradation is negligible. By utilizing this invention, the target Eb/No does not unnecessarily increase during DTX. Also, system capacity is increased.

In some implementations, the indicator bit is unprotected during transmission. In another preferred embodiment of the invention, implemented to enhance the reliability of indicator bit transmission, two power control bits per frame are utilized as "time diversity transmission." The concept of time diversity transmission permits a second bit to be sent as a back-up bit to the first indicator bit. In the time diversity transmission embodiment, two indicator bits are coherently combined at the receiver. A hard decision is made on the soft combined value to determine if the traffic has been gated off. In this way, the chances of error are significantly reduced. This saves transmit power because it reduces the likelihood that a bit will be received in error and cause the wrong power up response. The use of a time diversity transmission is thus helpful for the case in which wireless channel condition is harsh. Other detection methods, such as power detection method, may also be combined with this method to improve reliability.

While the invention has been particularly shown and described with reference to a preferred embodiment, it will be understood by those skilled in the art that various changes in form and detail may be made therein without departing from the spirit and scope of the invention.

Appendix A: Simulation Comparison of 800 Hz and 400 Hz Power Control

Simulations were performed in a normal power control scheme using a forward link only simulator to assess the required power of a FCH, and a SCH at several data rates. A rate set 1 (9.6 kb/s) FCH was simulated, and the SCH data rate that were simulated are the rate set 1 multiples up to and including 153.6 kb/s. The SCH simulations all used convolutional codes, rather than turbo codes. It is expected that for the transmission of data traffic, the FER targets used will be larger than the 1–2% values used for voice traffic. Therefore, two different FER targets were simulated, 5 and 10%.

In the FCH simulations, only the punctured power control bits are used for estimation of $E_b/N_o$ by the mobile. For SCH simulations, all traffic channel bits are used. For all data rates and FER targets, 7000 frames were simulated for 5 mobile velocities and two different channel conditions. The mobile velocities simulated were 1, 3, 9, 30 and 120 km/h. The two sets of channel conditions under which the simulations were performed are a one-multipath channel with $I_{or}/I_{oc}$ of 8 dB, and a two-multipath channel in which the two multipaths have equal average power and the $I_{or}/I_{oc}$ is equal to 3 dB.

An average required power for a given data rate and target FER was computed by taking the average of the individual simulation results over all speeds and over both sets of channel conditions. It was assumed that the five mobile velocities are equally likely. It was also assumed that a one-multipath channel condition is present 60% of the time, and a two-multipath condition 40% of the time. The results were normalized to the case of a 9.6 kb/s channel at a 1% target FER.

In the method of 400 Hz power control that was studied, the received signal is used to estimate the $E_b/N_o$ for two power control groups, and the estimate is used to generate a power control bit that is sent back to the transmitter. The power control bit is used to change the transmitted power 2.5 ms (2 PCG intervals) after the end of the $E_b/N_o$ estimation period.

In Table A1, we list the required power of each case, in dB relative to the baseline case. The results show that, for a given FER, the required powers are almost the same with the 800 Hz and the 400 Hz power control. It is also expected that the 350 Hz power control has a similar required power level.

TABLE A1

| Power Control Frequency | Required Power (dB) 5% FER Target | Required Power (dB) 10% FER Target |
| --- | --- | --- |
| 400 Hz | −2.44 | −3.67 |
| 800 Hz | −2.60 | −3.67 |

Appendix B: Sansung's Second Method

This Appendix provides a report of a simulation of the performance of the second of Samsung's frame error estimation methods. An optimal threshold for a given set of conditions was first found and then applied to other conditions to show it is no longer an optimal one.

The simulation is based on the IS-2000 DCCH configuration. The data rate of the DCCH is 9.6 kb/s. The coding rate is one half, and the spreading gain is 64. The power control step size on the forward link is 0.5 dB. The maximum forward gain is fixed at 0.5 or 50% of maximum BTS output power. The pilot channel gain is −7 dB relative to the maximum BTS output power. A single multipath Rayleigh fading channel is considered and the ratio of in-cell to out-of-cell interference is 8 dB.

The average forward gain and FER were collected as outputs of each simulation. Table 1 shows some simulation results of different threshold levels with a mobile moving at 30 km/h. For comparison, a simulation with the normal outer loop power control method was also performed for 1% target FER and the results are also listed in Table 1.

TABLE 1

Average forward gain and FER for different thresholds (30 Km/h, 1 multipath).

| Threshold in dB | Ave. forward gain | FER |
|---|---|---|
| 10.05 | 0.058232 | 0.0154% |
| 9.03 | 0.046188 | 0.0308% |
| 7.78 | 0.034418 | 0.1077% |
| 6.02 | 0.024192 | 0.2154% |
| 4.77 | 0.018270 | 0.4462% |
| 3.42 | 0.013502 | 1.0923% |
| 3.01 | 0.012422 | 1.4000% |
| Normal power control | 0.013665 | 1.0300% |

The simulation result indicates that a 10.05 dB Eb/No is required to meet 1% FER for 9.6 kb/s in one path Rayleigh fading environment. If the threshold value is set at the required Eb/No value, 10.05 dB, it will result in a very high average forward gain, 0.058, with a very low frame error rate, 0.0154%. therefore, a lot of power is wasted. As can be seen in Table 1, the optimal threshold is around 3.42 dB in this case. With this threshold, about the same performance and capacity could be achieved as the normal forward link outer loop power control has, which is 1.03% FER with 0.014 average forward gain.

For a given threshold of 3.42 dB, Table 2 gives the average forward gain and FER for different mobile velocities (Ior/Ioc=8 dB),and Table 3 shows the results for a set of ratio values of in-cell to out-of-cell interference in two-path multipath environment (MS velocity is fixed at 30 km/h). The different ratio values of in-cell to out-of-cell interference can translate into different MS locations in a cell. the larger the ratio, the closer the mobile to the base station.

In Table 2, an optimal threshold of 3.42 dB is obtained for the MS speed of 30 km/h. At this speed, 1% target FER can be achieved by an average forward gain of 0.0135. However, 1% target FER will not be met if this threshold is used at other speeds. Therefore, the optimal threshold varies with the MS speed.

TABLE 2

Effect of mobile speed on performance of Samsung method.

| Speed (km/h) | Ave. forward gain | FER |
|---|---|---|
| 40 | 0.012146 | 1.4154% |
| 35 | 0.013013 | 1.2615% |
| 30 | 0.013502 | 1.0923% |
| 25 | 0.014963 | 1.1692% |
| 20 | 0.015757 | 1.4154% |

To look at the effect of mobile location on the performance of Samsung method, the mobile velocity was fixed at 30 km/h and a simulation run for a set of ratio values in in-cell to out-of-cell interference (Ior/Ioc). The different ratio values of in-cell to out-of-cell interference can translate into different MS locations in a cell. The larger the ration, the closer the mobile to the base station. Since transmit power scales directly with Ior/Ioc for one-path in the link level simulation, a two-path case is looked at to illustrate the change with different values for Ior/Ioc.

TABLE 3

Effect of mobile location on performance of Samsung method

| Ior/Ioc (dB) | Ave. linear forward gain | FER |
|---|---|---|
| 6.99 | 0.012352 | 5.7846% |
| 5.23 | 0.016069 | 4.6769% |
| 3.98 | 0.019865 | 4.4308% |
| 3.01 | 0.023528 | 4.2000% |
| 2.22 | 0.027269 | 4.0923% |

Table 3 shows the average forward gain and FER for a set of Ior/Ioc ratio values with 3.42 dB threshold. It is noted that 1% target FER can be met at the Ior/Ioc ratio of 8 dB in one-path case. From Table 3, however, the target FER is no longer met in two-path case. Furthermore, the linear forward gain and FER vary quite widely with different values of Ior/Ioc ratio.

What is claimed is:

1. A method for controlling unnecessary power increases and call drop during discontinuous transmission (DTX) mode of a frame-based transmission system, said method comprising:

identifying one or more of a plurality of power control bits per frame as a DTX indicator recognized by a transmission protocol and logic within said system;

determining when traffic is to be gated-off in a transmission;

setting said DTX indicator to a first value, which indicates to a receiving unit when traffic in said frame is gated off, wherein the DTX indicator indicates normal traffic transmission when said DTX indicator is set to a second, different value; and transmitting said transmission with said DTX indicator to said receiving unit;

receiving said DTX indicator at said receiving unit of said transmission system, said DTX indicator being included within a received frame and indicating whether the received frame was transmitted with normal traffic or without traffic due to a gating-off of traffic at a source unit prior to transmission of said frame; and controlling a change in the target bit energy to noise spectrum density ratio (Eb/No) of subsequent transmissions over said transmission system based on information obtained from the reading of said DTX indicator, wherein Eb/No is not increased when said DTX indicator indicates a gating-off of traffic has occurred.

2. The method of claim 1, further comprising the steps of:
analyzing said one or more bits at said receiver; and
modifying a target Eb/No according to power control operation for normal traffic transmission when said one or more bit indicates a normal frame is being transmitted.

3. The method of claim 2, further comprising the steps of:
when said indicates that a gating-off of traffic has occurred, decoding said frame to determine whether or not there is normal traffic within the frame to reduce a possibility of error in said analyzing step;

modifying a target (Eb/No) according to power control operation for normal traffic transmission when said frame is decoded correctly;

maintaining a current target Eb/No when gating-off of normal traffic has been verified by said decoding step.

4. The method of claim 3, further including the step of:

initiating an operation to decode said frame as a normal traffic frame;

when the frame is decoded as a normal traffic frame, asserting normal power control for a subsequent transmission to a target; and when the frame is not detected as a normal traffic frame, performing one of several power control operations from among maintaining a current target SNR and implementing an outer loop power control mechanism for receipt of a frame in which traffic has been gated-off.

5. The method of claim 1, wherein said reading step detects both on a forward and a backward transmission path.

6. The method of claim 5, wherein said reading step detects said indicator from within one of a dedicated control channel (DCCH) and a suppemenal channel (SCH).

7. The method of claim 1, wherein said identifying step includes the step of implementing a time diversity transmission to enhance reliability of said signal, wherein said time diversity transmission utilizes a first and a second bit at different time locations within said frame, and wherein the first and second bits are coherently combined to determine if the traffic has been gated off.

8. The method for claim 1, said method comprising:

reading said DTX indicator from within a frame of a received transmission, wherein said indicator includes a bit that has one of two possible values including a first value indicating that the transmission includes normal traffic and a second value indicating that normal traffic has been gated off within the transmission;

when said bit is set to said first value, modifying a power level of the target signal-to-noise ratio (SNR) according to normal traffic transmission power control mode; and when said bit is set to said second value, modifying a power level of the target SNR according to an operating mode where normal traffic is not being transmitted within a transmission.

9. A system for controlling unnecessary power increases and call drop during discontinuous transmission (DTX) mode of a frame-based transmission system, said system comprising:

means for identifying one or more of a plurality of power control bits per frame as a DTX indicator recognized by a transmission protocol and logic within said system;

means for determining when traffic is to be gated off in a transmission; and means for setting said DTX indicator to a first value, which indicates to a receiving unit when traffic in said frame is gated off, wherein the DTX indicator indicates normal traffic transmission when said DTX indicator is set to a second, different value;

means for receiving said DTX indicator at said receiving unit of said transmission system, said DTX indicator being included within a received frame and indicating whether the received frame was transmitted with normal traffic or without traffic due to a gating-off of traffic at a source unit prior to transmission of said frame; and means for controlling a change in the target bit energy to noise spectrum density ratio (Eb/No) of subsequent transmissions over said transmission system based on information obtained from the reading of said indicator, wherein Eb/No is not increased when said DTX indicator indicates a gating-off of traffic has occurred.

10. The system of claim 9, further comprising:

means for analyzing said one or more bit at said receiving unit; and means for modifying a target Eb/No according to power control operation for normal traffic transmission when said one or more bit indicates a normal frame is being transmitted.

11. The system of claim 10, further comprising:

means, when said indicates that a gating-off of traffic has occurred, for initiating a decoding process to determine whether or not there is normal traffic within the frame to reduce a possibility of error in said analyzing step;

modifying a target (Eb/No) according to power control operation for normal traffic transmission when said frame is decoded correctly;

maintaining a current target Eb/No when gating-off of normal traffic has been verified by said decoding process.

12. The system of claim 11, further comprising means for:

means for initiating an operation to decode said frame as a normal traffic frame;

when the frame is decoded as a normal traffic frame, means for asserting normal power control for a subsequent transmission to a target; and when the frame is not detected as a normal traffic frame, means for performing one of several power control operations from among maintaining a current target SNR and implementing an outer loop power control mechanism for receipt of a frame in which traffic has been gated-off.

13. The system of claim 9, wherein said detecting means detects both on a forward and a backward transmission path.

14. The system of claim 13, wherein said detecting means detects said signal indicating gating-off of traffic or normal traffic on one of a dedicated control channel (DCCH) and a supplemental channel (SCH).

15. The system of claim 9, wherein said identifying means includes means for implementing a time diversity transmission to enhance reliability of said signal, wherein said time diversity transmission utilizes a first and a second bit at different time locations within said frame, and wherein the first and second bits are coherently combined to determine if the traffic has been gated off.

16. The method of claim 8, wherein a default value of said indicator bit indicates transmission of normal traffic.

17. The method of claim 8, wherein said bit is a first indicator bit and said method further comprises:

providing a second indicator bit as a back-up bit to said indicator bit, wherein a time diversity transmission is established; and combining said first and second indicator bit at a receiving unit of said transmission;

determining whether traffic has been gated off based on a resulting combination from said combining step, wherein an occurrence of an error due to reliance on said first bit is substantially reduce and a reliability of the power control method utilizing explicit signaling is substantially improved.

18. A communication unit for use within a CDMA communications system, said unit comprising:

means for providing an explicit signal within a frame of a received transmission, wherein said explicit signal includes a bit that has one of two possible values including a first value indicating that the transmission includes normal traffic and a second value indicating that normal traffic has been gated off within the transmission;

when said bit is set to said first value, means for modifying a power level of the target signal-to-noise ratio (SNR) according to normal traffic transmission power control mode; and when said bit is set to said second value, means for modifying the power level of the target SNR according to an operating mode where normal traffic is not being transmitted within a transmission.

19. The communication unit of claim 18, wherein said bit is a first bit among a plurality of bits, said communication unit further comprising:

means for providing a second bit as a back-up bit to said first bit, wherein a time diversity transmission is established;

means for combining said first and second bits at a receiving unit of said transmission; and means for determining whether traffic has been gated off based on a resulting combination from said combining means, wherein an occurrence of an error due to reliance on said first bit is substantially reduce and a reliability of the power control method utilizing explicit signaling is substantially improved.

20. The communication unit of claim 18, further comprising:

means for identifying one or more of a plurality of power control bits per frame as a DTX indicator recognized by a transmission protocol and logic within said system;

means for determining when traffic is to be gated off in a transmission;

means for setting said DTX indicator to a first value, which indicates to a receiving unit when traffic in said frame is gated off, wherein the DTX indicator indicates normal traffic transmission when set to a second, different value; and means for transmitting said transmission to another communication unit.

21. The communication unit of claim 20, further comprising:

when said indicates that a gating-off of traffic has occurred, verifying that said gating off has occurred by one of a plurality of methods from among:

decoding said frame to determine whether or not there is normal traffic within the frame; and calculating a decision variable as a ratio of said SNR of said traffic and said SNR of a power control bit(PCB) and comparing the decision variable against a pre-established threshold.

22. The communication unit of claim 22, wherein said communication unit is a mobile station.

23. The communication unit of claim 22, wherein said communication unit is a base station.

* * * * *